(No Model.) 6 Sheets—Sheet 1.
J. B. CLOT.
MACHINERY FOR FORMING AND SOLDERING BODIES OF METALLIC PACKING CANS.
No. 544,721. Patented Aug. 20, 1895.
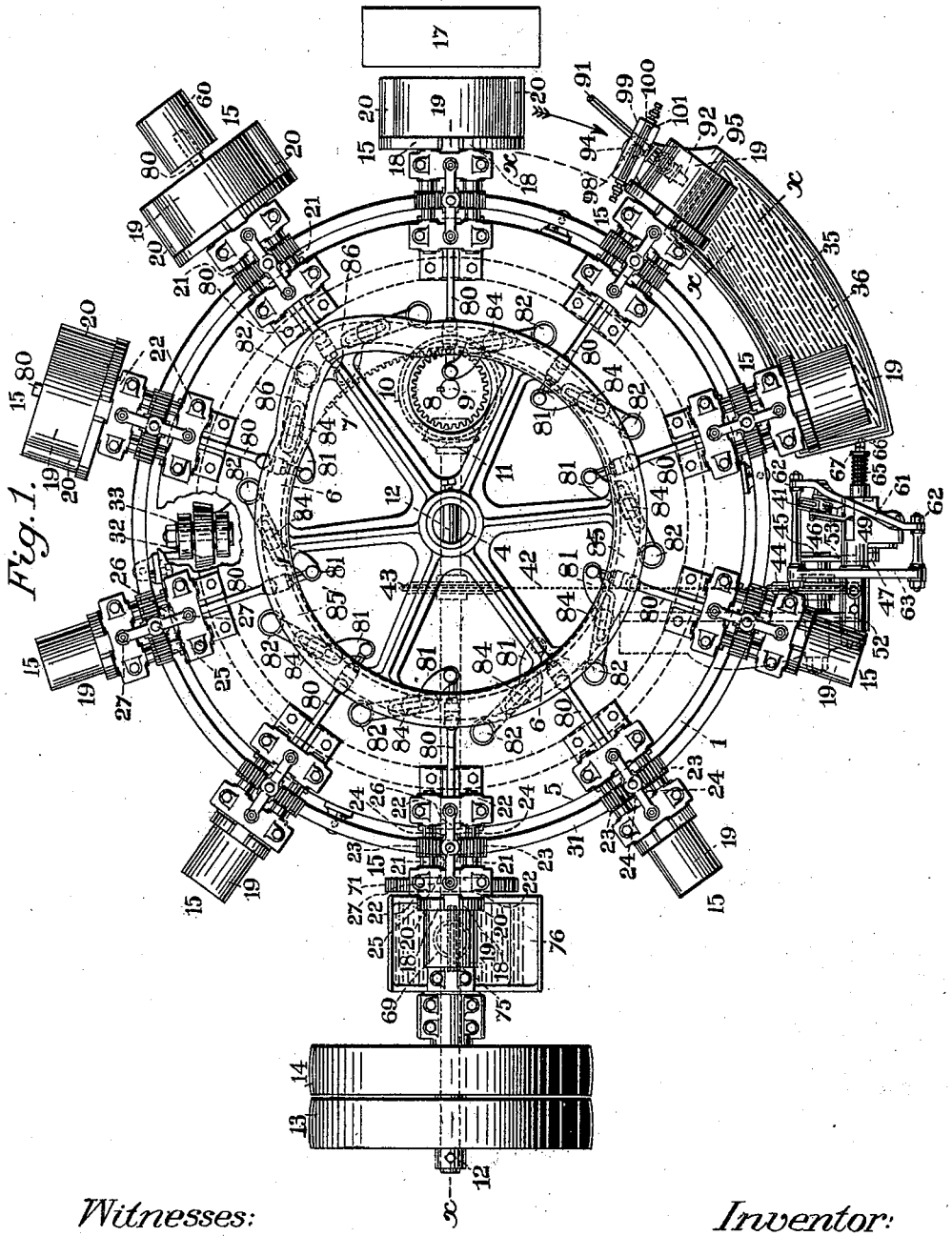
Witnesses:
E. A. Brandau
F. Orton
Inventor:
John B. Clot
By John Richards
Atty

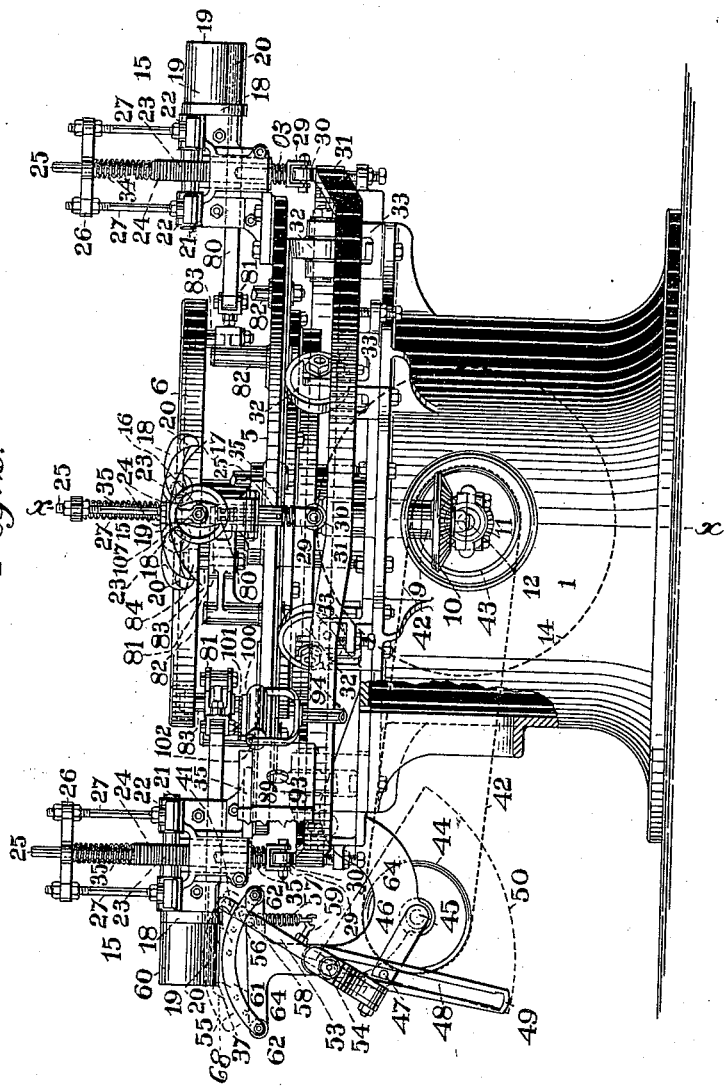

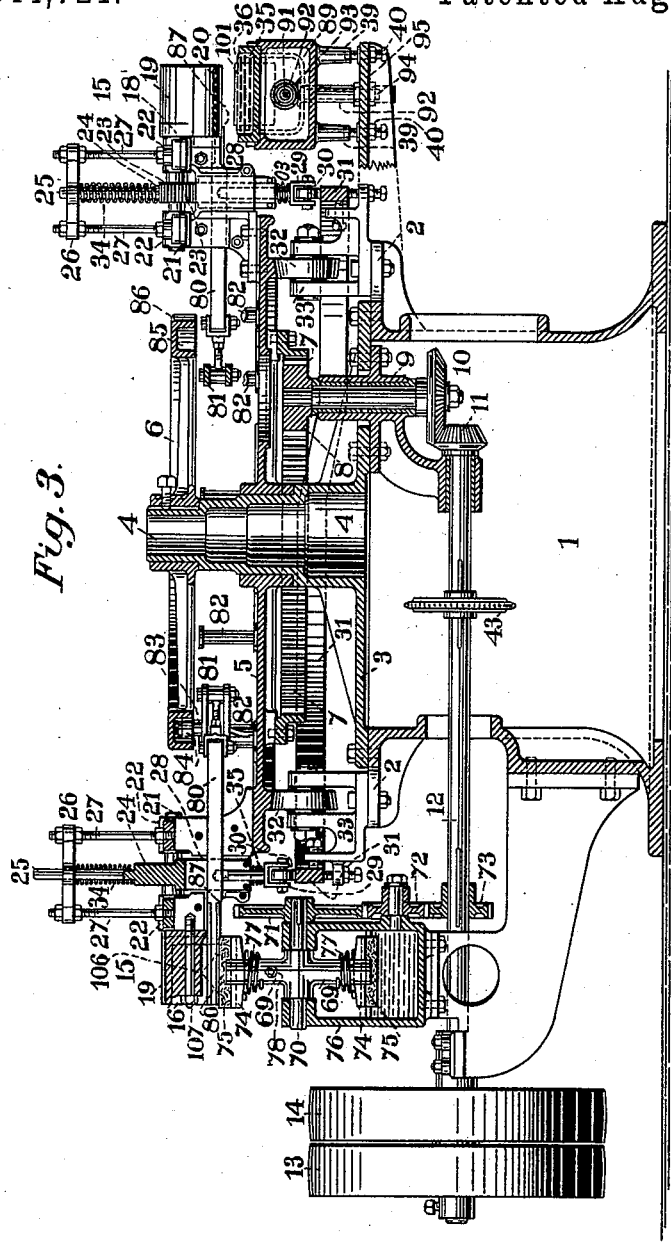

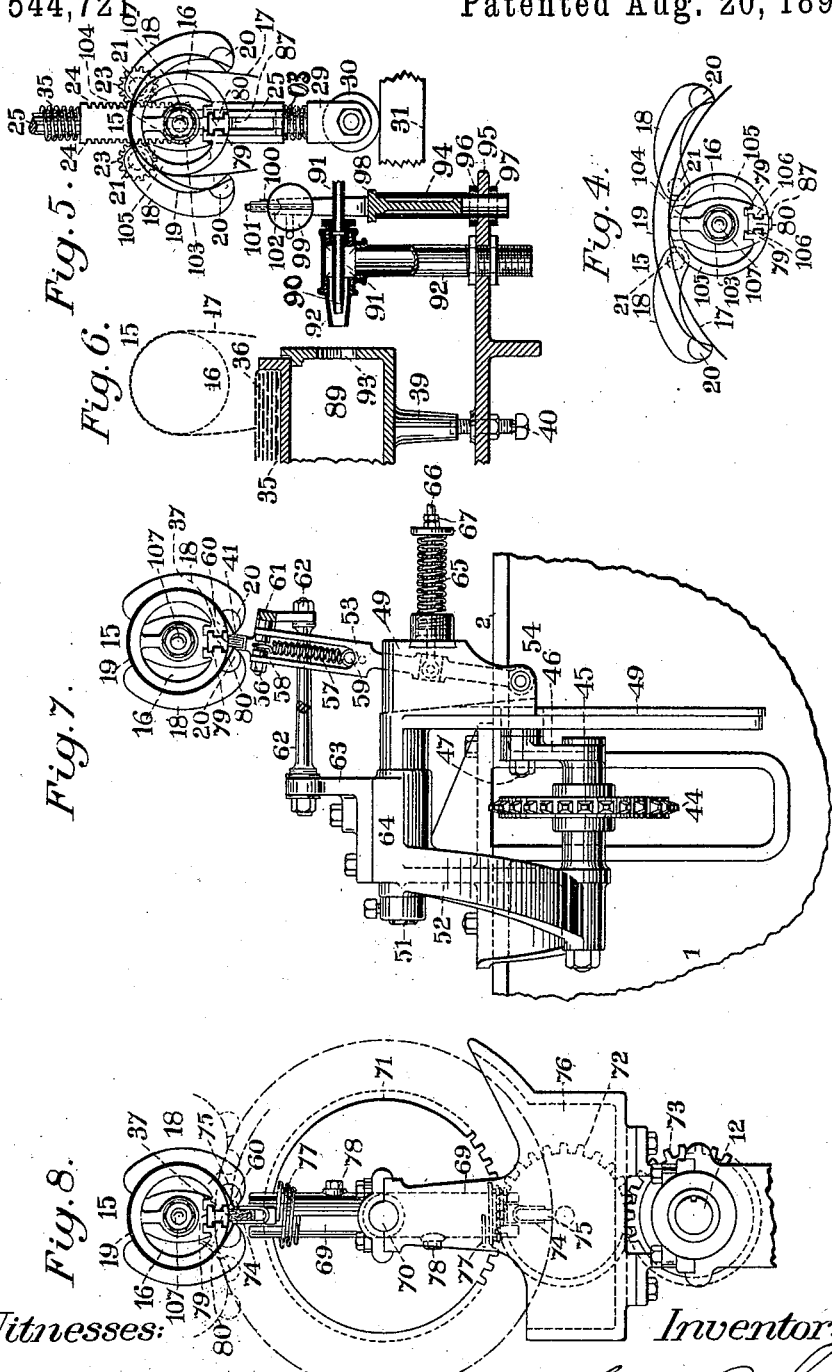

(No Model.) 6 Sheets—Sheet 5.
J. B. CLOT.
MACHINERY FOR FORMING AND SOLDERING BODIES OF METALLIC PACKING CANS.
No. 544,721. Patented Aug. 20, 1895.
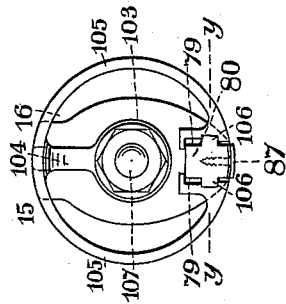
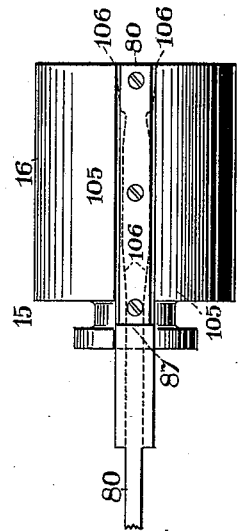
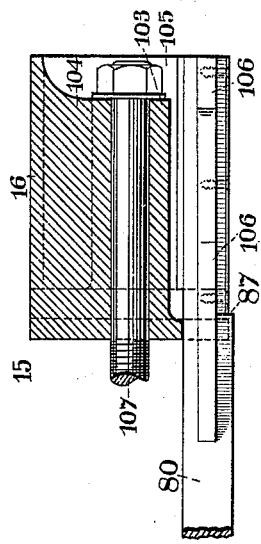
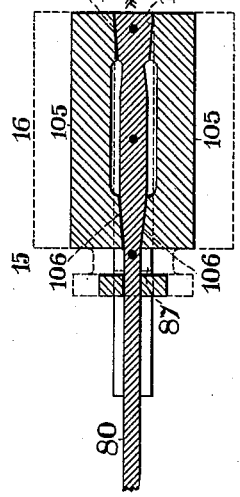
Witnesses:
E. A. Brandau
J. Orton
Inventor:
John B. Clot
By John Richards
Atty (No Model.) 6 Sheets—Sheet 6.
J. B. CLOT.
MACHINERY FOR FORMING AND SOLDERING BODIES OF METALLIC PACKING CANS.

No. 544,721. Patented Aug. 20, 1895.

Witnesses
Edw. S. Duvall Jr.
Wm. L. Boyden

Inventor
John B. Clot
per Fred E. Tasker
Attorney

UNITED STATES PATENT OFFICE.

JOHN B. CLOT, OF SAN FRANCISCO, CALIFORNIA.

MACHINERY FOR FORMING AND SOLDERING BODIES OF METALLIC PACKING-CANS.

SPECIFICATION forming part of Letters Patent No. 544,721, dated August 20, 1895.

Application filed December 18, 1893. Serial No. 493,964. (No model.)

*To all whom it may concern:*

Be it known that I, JOHN B. CLOT, a citizen of the United States, residing in the city and county of San Francisco, State of California, have invented certain new and useful Improvements in Machinery for Forming and Soldering the Bodies of Metallic Packing-Cans, of which the following is a specification.

My invention relates to machinery for automatically bending and shaping the bodies of cylindrical packing-cans made from sheet metal and soldering the seams or side joints of the same.

My improvements consist in various mechanical agents and expedients that cannot be clearly described except in connection with the drawings herewith, and forming a part of this specification, in which—

Figure 14:
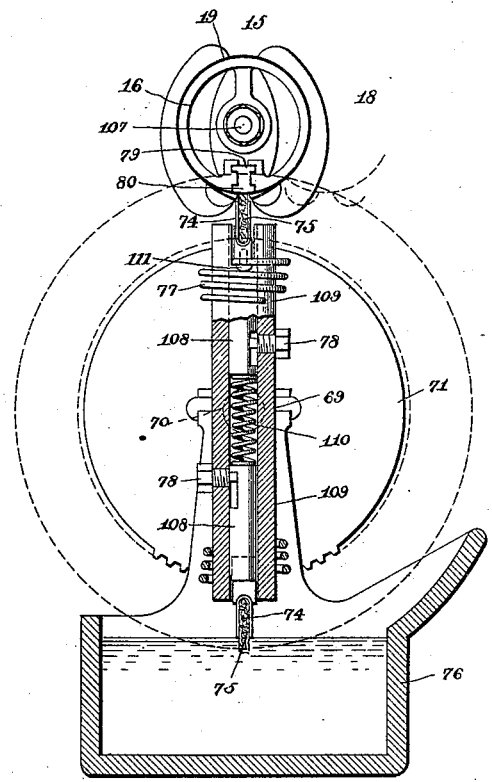
Figure 15:
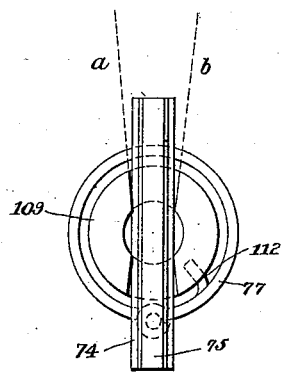

Figure 1 is a general plan view of a can-body forming and soldering machine constructed according to and embodying my improvements. Fig. 2 is a side elevation of the same machine, some of the details being omitted. Fig. 3 is a section on the lines $x\,x$ of Figs. 1 and 2. Fig. 4 is an enlarged detail showing the extended position of the bending or closing jaws, and the form, in edge view, of the plate or sheet for a can-body when first inserted in the machine. Fig. 5 is a detail showing an end view of the principal can-forming details of the machine, the plate being partially bent or closed. Fig. 6 is an enlarged detail of the mechanism for fluxing or preparing the surface for soldering, also of the solder-bath in which the ends of the plate are immersed. Fig. 7 is an enlarged detail showing the mechanism for clearing the seams of surplus solder. Fig. 8 is another enlarged detail showing the mechanism for cooling the seams after soldering. Fig. 9 is a diagram of the end of the can-body after completion. Fig. 10 is a vertical section through one of the dies or formers around which the sheets are bent. Fig. 11 is a complete end view of the same. Fig. 12 is a section on line $y\,y$ of Fig. 11. Fig. 13 is a bottom view of Fig. 11. Fig. 14 is a view similar to Fig. 8, on an enlarged scale, and in partial section. Fig. 15 is an end view of one of the sponge-carrying arms with the sponge and its clamp.

Similar numerals of reference are employed to denote corresponding parts in the various figures of the drawings.

Referring first to Figs. 1, 2, and 3, 1 is the main frame of the machine, cylindrical in form, having a wide outward-extending flange 2 at the top, and a strong covering-plate 3 bolted in the flange 2, as shown in Fig. 3. On this plate 3 is formed a strong hollow stud 4, on which revolves the main movable member or table 5, to which is attached the main operating parts of the machine. This main table is sustained vertically by means of bearing-rollers 32, supported in brackets 33 bolted to the flange 2 of the main frame, as shown in Fig. 3. Above this main movable and revolving table 5, and fixed to the stud 4, is a stationary disk or wheel 6, the functions of which will be explained farther on.

The main revolving table 5 is driven by means of an internal gear-wheel 7 bolted to the under side thereof, and a pinion 8 meshing into this wheel, as shown in Fig. 3. This pinion 8 is keyed to the top of the shaft 9, driven by the bevel-wheels 10 and 11, the shaft 12 and main driving-pulley 14, a loose pulley 13 being provided for stopping and starting the machine.

At equidistant spaces around the main revolving table 5 are mounted duplicate forming apparatus 15, (shown here ten in number, as in Fig. 1,) so that at each revolution of the main table 5 ten can-bodies are formed and soldered.

Referring now to the moving or revolving apparatus 15, these consist of flexible dies or formers 16, around which the sheets 17 are bent to a circular form by means of pivoted jaws 18 and a flexible back-strap or spring 19, made of thin metal and attached to the studs 20, projecting outward from the jaws 18, as shown in Figs. 4, 5, 7, and 8. These jaws 18 are mounted on oscillating shafts 21, supported in bearings 22, and given a coincident reverse motion by means of the pinions 23 and double-face racks 24 that engage the pinions 23 at each side. The double racks 24 have a cylindrical extension 25 at the top, sliding in the cross-bars 26, supported on studs 27, and at the bottom or square section sliding in the bearings 28. Below these bearings 28 the rack-bars are formed with crotches 29 to receive rollers 30 that bear on a circular track 31, extending all the way around, and adjustably supported on the flange 2 of the main frame 1, as seen in Fig. 2. A coil-spring 34 causes a constant downward pressure on the racks 24 and on the rollers 30, so the latter follow the profile of the circular track 31, which is depressed at the front or operating side of the machine, as seen in Fig. 2. The depression in the circular track 31 thus permits a downward movement of the double rack 24, partially turning the shafts 21, expanding the jaws 18 to the position shown in Fig. 4. As the main table 5 revolves, the rollers 30, following the profile of the track 31, rise, and by means of the gearing just described partially close the jaws 18 around the former or dies 16, which are brought to the position shown in Fig. 5 and indicated in Fig. 6.

Between the crotches or brackets 29 and the lower end of the stem or sliding bar 25 are placed stiff coil-springs 03, that in case of false adjustment of the track 31, or by other cause, the machinery becomes jammed or obstructed, these springs 03 will yield and prevent accident. These springs 03 are made stiff enough to withstand the working strain on the racks 24 and jaws 18 without yielding.

The first operation after the sheets or plates 17 are partially formed is to cleanse or flux the surfaces to which the solder is to adhere. This is performed by a hinged wiper made of some porous flexible material, mounted as shown in Figs. 1 and 6, 94 being a hollow supporting-tube attached to the flange 95 by the screw-nuts 96 and 97 and vertically adjustable. In this hollow tube 94 is a loosely-fitting stem 98, on the top of which is attached a hinged or pivoted vessel 99, mounted in a bracket, as shown in the plan view, Fig. 1, with an open slot in its top, containing acid, oil, or other fluxing liquid. In this vessel is a flat tube 100, containing a wiper or wick 101, set at such height in respect to the bent sheet 17 that the edges thereof will come in contact with the wick 101 and successively be fluxed, cleaned, and prepared to receive the solder. The stem 98 is of cylindrical or spindle form, so that it may rotate freely in the socket or tube 94, in which it is loosely placed, and this permits the flat wick-weight 101, which is carried by the stem 98, to automatically adjust itself as the table 5 revolves, so that said wick may properly act to clean the sheet 17.

The vessel 99 is mounted on pivots at its ends, because the flexure of the wick or wiper 101 is not enough to permit efficient action and to secure the required rigidity and rubbing contact, and so the vessel 99 will by its gravity regain its vertical or normal position after each end of the plates 17 pass over the wick 101.

The relation of the several parts are indicated by their relative positions in Figs. 5 and 6. From this point the sheet or plate moves on to a solder-bath 35, which is kept full by a supplementary supply, so the melted solder will stand by globular influence a little above the rim of the bath, as shown at 36 in Fig. 6. As the sheet or plate 17 passes over this bath, the tips or edges thereof dip into the melted solder, are heated, and take up sufficient solder to form the joint or seam 37.

The solder-bath, with the furnace or chamber 89 beneath, is adjustably mounted on stands 39, having vertical adjusting-screws 40, so that its height can be regulated at will, and if required for deeper immersion of the plates 17, this solder-bath 35 can be given a vertical movement by means of proper gearing, but is preferably fixed during the operation of the machine.

The furnace or chamber 89, beneath the solder-bath 35, can be heated in any convenient manner, preferably a gas-jet or Bunsen burner for gas and air, as shown at 90 in Fig. 6, where 91 is a gas-pipe and 92 an air-pipe, arranged in the usual manner, so the flame will enter the aperture 93 in the furnace 89. While the sheets or plates 17 are heated and in the hot bath of melted solder the jaws 18 are closed by the configuration or profile of the circular guiding-track 31, as before explained, so the seam is pressed together uniformly by action of the rack 24 and is closed, as shown in the diagram, Fig. 9, and adhere firmly. The sheet or plate is then, by movement of the revolving table 5, carried beyond the solder-bath 35 and begins to cool.

The tips of the jaws 18 and lower edges of the studs 20, to which the back-straps 19 are attached, also other operating parts exposed to the melted solder, I cover or coat with aluminium or other suitable metal or alloy to prevent the adhesion of melted solder thereto.

Passing onward by reason of the rotation of the table 5, the now soldered can-body reaches the cleansing apparatus, (shown in Figs. 2 and 7,) consisting of a reciprocating wiper having a tip 41 of asbestos or other refractory material that passes over the soldered seam while the solder is yet soft, and brushes off the surplus metal that adheres on the outside, smoothing and completing the joint. This cleansing and smoothing apparatus is driven by a pitch-chain 42, passing around a wheel 43 on the main driving-shaft 12 and the wheel 44 on the crank-shaft 45. On this shaft 45 is a crank 46, having a pin and sliding block 47 moving in a slot 48 of the swinging lever 49, the lower or outer end of which moves in the arc 50, as shown in Fig. 2. Operated by this swinging lever 49, which has its support on the stud 51, held in the bracket 52, is a second end lever 53, having its radial fulcrum or bearing at 54 in the main lever 49, so that the reciprocal movement of the main lever 49 causes a modified movement of the second lever 53 in the arc indicated by dotted lines at 55 in Fig. 2. On the end of this lever is an asbestos tip 41 to clean and smooth the seam 37, as before described; but as this movement or action must be rectilinear in respect to the can-body, provision is made for this in the following manner: The lever 53 is not continuous, but is jointed at 56, so that as it moves forward or outward the hinged section containing the tip 41 is deflected or yields backward, so as to follow in a right line over the seam 37, the end of the tip 41 being made in curved form for that purpose.

To maintain a uniform pressure of the tip 41 on the seam 37 a spring 57 is provided. This spring 57 is attached to a short crank 58 on the axis of the flexible extension or tip 41 of the lever 53 and to a hook 59 on the same lever, so there is a constant elastic pressure of the tip 41 against the seam 37 on the outward or working stroke. As, however, the table 5 is continually revolving, this wiping movement of the tip 41 must not only follow the seam 37 of the can-body parallel to its axis, but must also have a lateral movement to accommodate the rotation of the table 5 and of the can-body 60. This I attain by means of a diagonal guide-bar 61, held on the studs 62, held in a stand 63 bolted to the bracket 64, which is attached to the flange 2 of the main frame 1.

Referring to Fig. 1, it may be seen that as the lever 53 moves forward the angular guide-bar 61 will cause a lateral movement of the lever 53 and its flexible tip 41, corresponding to the rotation of the main table 5, the same as if the can-body 60 was stationary.

To cause the lever 53 to follow the guide-bar 61, I employ a coil-spring 65 that maintains a constant tension on the rod 66 and laterally on the lever 53. This tension is regulated by the nuts 67, so as to keep the lever 53 in close contact with the angular guide-bar 61.

When the wiper 41 has traversed the length of the seam and has passed beyond the can-body, it will be in the position shown by dotted lines at 68 in Fig. 2, and being there released will be violently thrown into its extended position by action of the spring 57, any adhering solder will be thrown off by the shock, and the wiper 41 be thus kept clean. This completes the forming and soldering operations, and the can-bodies pass on by revolution of the table 5 until the soldered seam is partially cooled in the air and then is completely cooled by means of the apparatus shown in Figs. 1 and 2; also in the enlarged view, Figs. 8, 14, and 15. Two sponges 75 are held in the movable clamps or sockets 74, which are carried by the stems 108 that fit loosely in the hollow arms 109 of the main revolving frame or support 69. The outer ends of these arms 109 are slotted, as shown in Figs. 8, 14, and 15. (See particularly Fig. 15, where the shape of the slots is shown and where it is seen that a space is left at the sides of the clamps 74, so that they can partially revolve automatically, as indicated by the dotted lines $a$ $b$ in Fig. 15, and thus permit the sponges to adjust themselves parallel to the seams 37 of the cans 60.) Coiled springs 77, surrounding the arms 109, are provided to hold the sponge-clamps 74 in the proper position when the sponges 75 are out of contact with the can-seam. These springs 77 are coiled about the arms 109, as shown in Fig. 14. One end of the spring is bent at 112 (see Fig. 15) and driven into the side of arm 109, and in this way is securely fastened thereto. The other end of the spring is bent into the shape of an eye and secured by a tack or pin 111, passing through the eye to the under side of clamp 74, as shown clearly in Fig. 14. These sponge-clamps 74 have also a sliding outward and inward movement in the hollow arms 109, radial from the axis of the shaft 70 on which the frame 69 is mounted. A spring 110 is arranged between the inner ends of the stems 108, and this acts to press the stems and the clamps and sponges outward, the range of movement being limited by stop-screws 78. (Shown clearly in Fig. 14.)

The revolving frame 69 is mounted on a shaft 70 driven by the wheels 71 72 and the wheels 73 on the main driving-shaft 12, as shown in section at Fig. 3, so this frame or support 69 revolves positively in respect to the main table 5, and so the upper or acting sponge is applied to the seam, while the other or lower one is passing through the tank 76, taking up fresh water and being cooled. Thus the two sponges 75 come in regular position and sequence to cool the seams 37.

Referring now to the last function of the machine—discharging or removing the finished can-bodies after their completion.

In the bottom portion of the dies or forms 16 there is a rectangular groove or seat 79 with inturned ledges at the top to receive the sliding bars 80, which extend inwardly and are connected to levers 81 mounted on studs 82. In Figs. 2, 4, 5, 7, 8, and 14 the sliding bars 80 are shown as having side longitudinal grooves that are engaged by ribs or tongues 106 on the sides of seats 79. In Figs. 10, 11, 12, and 13 the sliding bars 80 are shown as having these ribs 106 formed on the sides of the bars and engaging grooves on the sides of the seat 79. These two forms are plainly substitutes for each other, and either form may be used. These levers 81 have each of them vertical studs 83, on which are rollers 84 that move loosely in a continuous channel or groove 85 formed on the under side of the fixed plate 6. By referring to the plan view, Fig. 1, it will be seen that this groove 85 diverges to a cam form at 86 from its cylindrical form, so the rollers 84, the levers 81, and the bars 80 are forced outward at this point 86.

The dies or formers 16, (shown in the enlarged views, Figs. 10 to 13,) are composed of a central supporting nave or hub 103, held on a stem 107, a strut 104, and a flexible cylindrical shell 105. This shell 105 is severed and grooved at the bottom to receive the sliding bar 80, as before described. On the sides of this bar 80 are oblique ledges or wedges 106, fitting against corresponding matrices or seats at its sides, as shown in Figs. 10, 11, and 12. These ledges or wedges 106 serve to expand and permit the contraction of the flexible dies or formers 16 as the bar 80 is moved inward and outward, as before described. The object of thus expanding and contracting the dies or formers 16 is that during the time the plates are being soldered they are in a more or less expanded state, and contact when they are cooled by the sponges shown in Fig. 8 and in passing through the air afterward, so they nip the dies or formers 16 and cannot be removed without force unless the dies or formers 16 are contracted. This is the purpose of the oblique or tapering ledges 106. When the bar 80 moves forward, and before the indent 87 comes in contact with the can-bodies 17 on the dies or formers 16, these inclined ledges or wedges permit the curved sides 103 of the die or former 16 to spring inward, thus reducing its diameter and loosening the can-body thereon, so it will be easily removed by the bar 80 and the indent 87.

Mechanism for feeding the plates or sheets 17 to the machine not forming an integral part thereof or of the present invention, is not shown here, and may be understood without further reference.

It will be understood that the solder bath means of bending and releasing the plates, and various other parts of my invention, will remain the same whether the movement of the dies or formers 16 and their attendant parts be by rotation or rectilinear, by means of endless chains, bands, or otherwise.

Having thus declared the nature and objects of my invention and described the manner of constructing the same, I claim as new and desire to secure by Letters Patent—

1. In a can-body forming and soldering machine, a series of dies or forming apparatus as herein described, a solder bath over which the sheets or plates to form the can-body are passed, when partially bent or formed, so the tips or edges of the sheets will stand at a right angle to the surface of the solder bath, and the two faces to be joined will be forward and presented to the melted solder, in the manner substantially as described.

2. In a can-body forming and soldering machine, a main rotating table having a series of radial dies or formers around which the sheets forming the can body are bent; pivoted jaws embracing these dies or formers automatically and coincidently operated by means of the circular guideway the profile of which conforms to the movement and positions of the revolving main supporting table, so the sheets or plates will be bent downward around the dies or formers, so held and moved forward in definite or positive sequence, in the manner substantially as described.

3. In a can-body forming and soldering machine, a main rotating table having a series of formers or dies thereon at equidistant spaces, dies or formers, as herein shown, with closing jaws to embrace the formers or dies, and a flexible back strap attached to the jaws and covering the sheet from which the can body is formed, so it will be equally and uniformly curved and bent downward around the dies or formers, and subjected to a pressure outward from the center toward the edges, in the manner substantially and for the purposes specified.

4. In a can-body forming and soldering machine, a main rotating table provided with a series of dies or formers with pivoted jaws, and a flexible back strap to bend and curve the sheets downward around the dies or formers from the center to the edges; pinions, a double rack, and cylindrical guide or track beneath the revolving table, its profile formed to extend and close the forming jaws at and over certain distances of the main table's rotation, in the manner substantially as shown and described.

5. In a can-body forming and soldering machine, a rotary main table having a series of forming apparatus for receiving, holding and curving the plates for can bodies; a guide way or track beneath the main table with rollers, racks and pinions to control the forming apparatus, and, in combination therewith, a solder bath into which the edges of the sheet will be dipped during or before the completion of the forming operation, in the manner and for the purposes substantially as described.

6. In a can-body forming and soldering machine, a series of forming devices, as herein shown; dies or formers, around which sheets are bent from the top downward in positive sequence and stages; a soldering bath in such relation thereto that the sheets are dipped in the solder and the seams finally closed as they are carried over and from the solder bath, and while at their highest temperature, in the manner substantially as shown and described.

7. In a can-body forming and soldering machine, a rotating main table with can-forming and soldering apparatus set in series thereon; devices to form and close the sheets, as herein described, in combination with a pivoted wiping and cleaning lever, provided with a flexible tip and having a compound radial and lateral movement, so it will act parallel with the soldered seam and in definite relation to the movement of the main rotating table, in the manner substantially as described.

8. In a can-body forming and soldering machine, a main rotating table having an equidistance series of can-forming and soldering devices mounted thereon; a wiping or cleaning pad or tip operated positively by connection with the main table's rotary movement; a crank and compound levers, as herein described, to produce an approximately uniform radial movement of the wiping or cleansing pad or tip; a stationary diagonal guide to cause a lateral movement of the wiping tip or pad, so its angular velocity will conform to the main table's movement, in the manner substantially as described.

9. In a can-body forming and soldering machine, a main rotating table provided with automatic forming and soldering apparatus for the sheets, and wiping or cleansing devices to remove the surplus solder from the seams; cooling devices consisting of sponges or porous material mounted on a revolving frame or support positively geared in respect to the rotary movement of the main table, passing consecutively through a tank of cooling water coming in contact consecutively with the soldered seams of the can, in the manner substantially as shown and described.

10. In a can-body forming and soldering machine, a main rotating table provided with a series of dies or forms, around which the sheets are formed and the seams are soldered, these dies or forms grooved on their bottom side and provided with sliding ejecting bars, in combination with a continuous stationary cam groove or guide way that positively operates the sliding ejecting bars and removes the completed can bodies from the dies or formers at a predetermined point, in the manner substantially and for the purposes specified.

11. In a can-body forming and soldering machine, a main rotating table provided with can-forming and soldering apparatus, as herein described; a series of ejecting bars sliding in grooves or channels formed in the dies on which the can bodies are formed and soldered, these ejecting bars attached to levers moved by a continuous cam groove or guide way, so the ejecting bars are driven outward and the finished can body removed from the dies with definite relation to the movement of a main table on which the die-forming apparatus is mounted, substantially as described.

12. In a can-body forming and soldering machine, a series of dies or formers arranged to pass over a solder bath placed beneath their path; bending or forming jaws and back straps to bend or curve the plates downward around the dies or formers, so their edges will dip into a solder bath beneath, fluxing, cleaning and cooling devices in combination therewith, so the operation will be automatic and continuous, in the manner and for the purposes substantially as specified and described.

13. In a can-body forming and soldering machine, a series of dies or formers arranged by proper mechanism to pass successively over a solder bath in which the edges of the partially-formed plates are immersed, the dies or formers consisting of open-sided cylinders, flexible and capable of expansion and contraction, so the completed can body can be loosened and removed after cooling, in the manner substantially as described.

14. In a can-body forming and soldering machine, expansible dies or forms around which the sheets or plates are bent, consisting of open-ended cylinders flexibly supported by a nave or hub open or slit at one side, tapering wedges or keys moving outward and inward in the slit parallel to the axis of the cylinder or former so the latter will be expanded and caused to permit the removal of the completed can bodies, substantially as described.

15. In a can-body forming and soldering machine, expanding dies or formers around which the plates or sheets are bent; with pivoted automatic jaws and back straps, so arranged and operated as to pass over a solder bath and immerse the edges of the sheet when the latter are partially formed or bent in the melted solder; apparatus in combination therewith for cleansing and cooling the soldered joints, in the manner substantially as described.

16. In a can-body forming and soldering machine, a series of dies or forming apparatus as herein described, a solder bath over which the tips or edges of the sheets or plates are passed, so that the edges will be successively exposed to the solder and be coated therewith, wiping devices to remove the surplus solder from the seams, and cooling sponges or pads that are alternately immersed in water and applied to the seams, in the manner substantially as described.

17. In a can-body forming and soldering machine, a series of dies or forming apparatus as herein described, a solder bath over which the plates or sheets are passed when partially formed and their edges or tips successively exposed to the solder and coated therewith, wiping devices to remove the surplus solder from the seams, and cooling pads or sponges revolving on an axis and connected with the main table, in such relation that the cooling pads or sponges will be alternately dipped in a tank of water and applied to the seams of the cans, in the manner substantially as described.

In testimony whereof I have hereunto affixed my signature in the presence of two witnesses.

JOHN B. CLOT.

Witnesses:
ALFRED A. ENQUIST,
WILSON D. BENT, Jr.